(12) United States Patent
Resh et al.

(10) Patent No.: US 6,520,032 B2
(45) Date of Patent: Feb. 18, 2003

(54) SEAT BELT TENSION SENSING APPARATUS

(75) Inventors: Robert E. Resh, Dyrden, MI (US); William J. Fleming, Rochester, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/818,126

(22) Filed: Mar. 27, 2001

(65) Prior Publication Data

US 2002/0139196 A1 Oct. 3, 2002

(51) Int. Cl.[7] .................................................. G01L 1/04
(52) U.S. Cl. ...................................... 73/862.472; 73/831
(58) Field of Search ........................ 73/865.9, 862.393, 73/862.391, 862.331, 862.451, 862.46, 862.472, 827, 831; 318/280; 280/735, 806; 701/45; 242/385.3

(56) References Cited

U.S. PATENT DOCUMENTS

| | | | |
|---|---|---|---|
| 3,737,849 A | 6/1973 | Mead | 340/457.1 |
| 3,817,093 A | 6/1974 | Williams | 73/862.474 |
| 3,994,162 A | 11/1976 | Auckland et al. | 73/862.46 |
| 4,141,245 A | 2/1979 | Brandstetter | 73/862.46 |
| 4,741,556 A * | 5/1988 | Nagashima | 242/374 |
| 5,054,815 A * | 10/1991 | Gavagan | 188/65.1 |
| 5,413,378 A | 5/1995 | Steffen, Jr. et al. | 280/735 |
| 5,517,863 A | 5/1996 | Sodermaim | 73/862.42 |
| 5,965,827 A * | 10/1999 | Stanley et al. | 73/862.391 |
| 5,996,421 A | 12/1999 | Husby | 73/862.451 |
| 6,259,042 B1 * | 7/2001 | David | 177/136 |
| 6,352,305 B1 * | 3/2002 | Desmaison | 297/216.14 |

* cited by examiner

Primary Examiner—Max Noori
(74) Attorney, Agent, or Firm—Tarolli, Sundheim, Covell, Tummino & Szabo, L.L.P.

(57) ABSTRACT

Apparatus (10) includes first and second members (20, 22) that are connected to each other and pivotable relative to each other about an axis (46). A spring (120) biases the first member (20) to pivot in a first rotational direction relative to the second member (22). A seat belt (14) engages the first member (20) and urges the first member to pivot against the bias of the spring (120) in a second rotational direction as tension in the seat belt increases. The relative angular position of the first and second members (20, 22) changes in proportion to the amount of tension on the seat belt. The apparatus (10) also includes a sensor (24) for measuring the angular position of the first member (20) relative to the second member (22) and providing a signal corresponding to the angular position. The signal is proportional to the amount of tension in the seat belt (14).

23 Claims, 4 Drawing Sheets

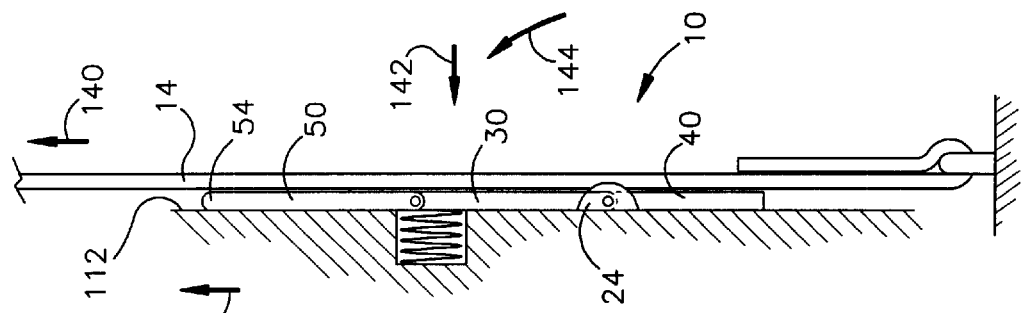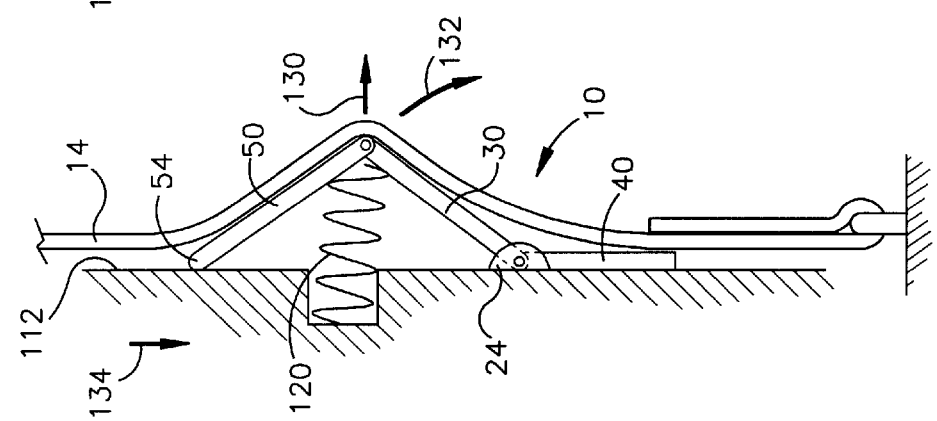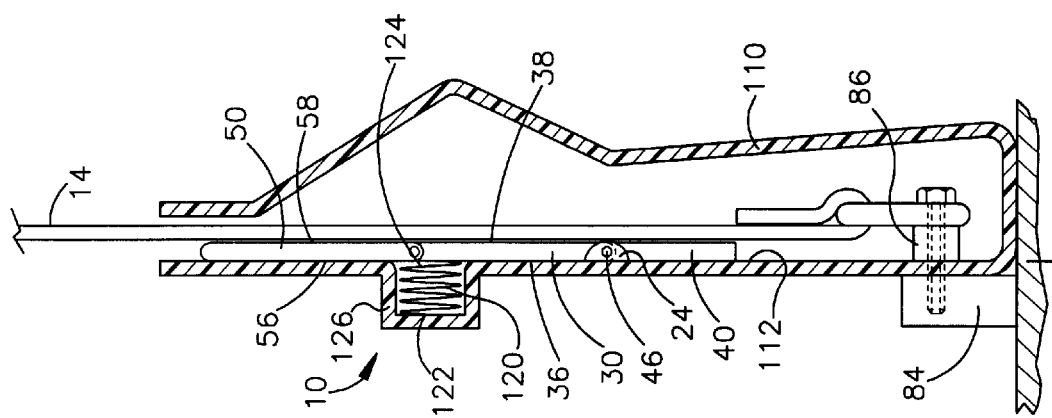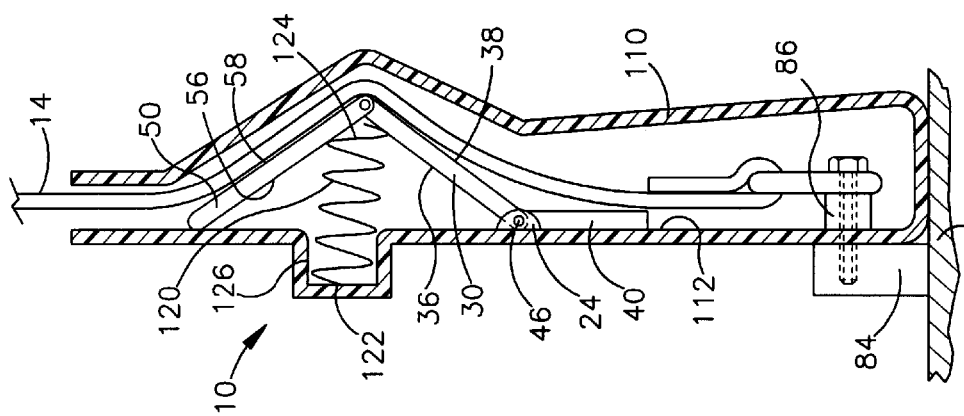

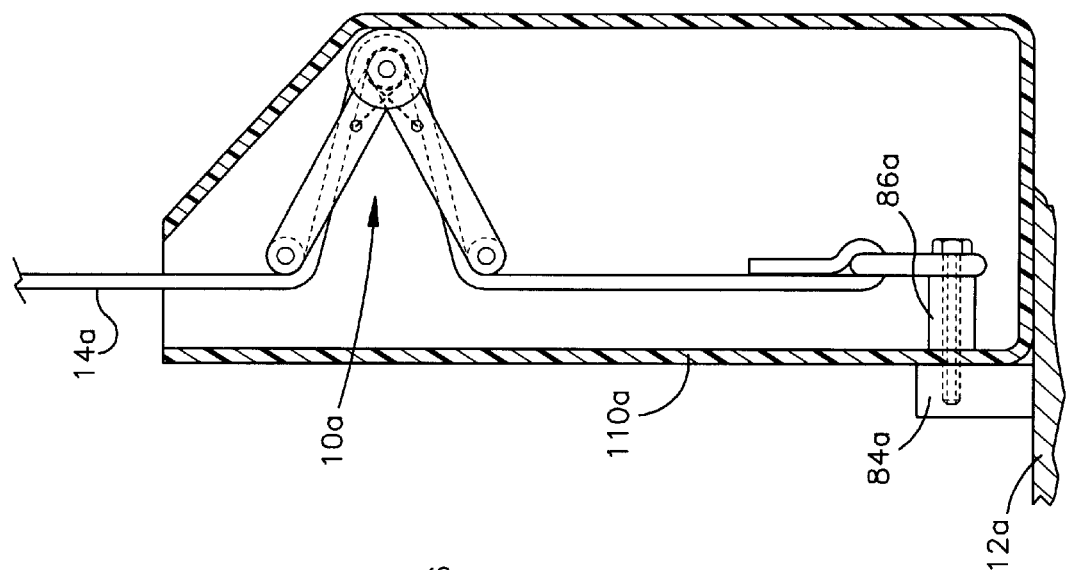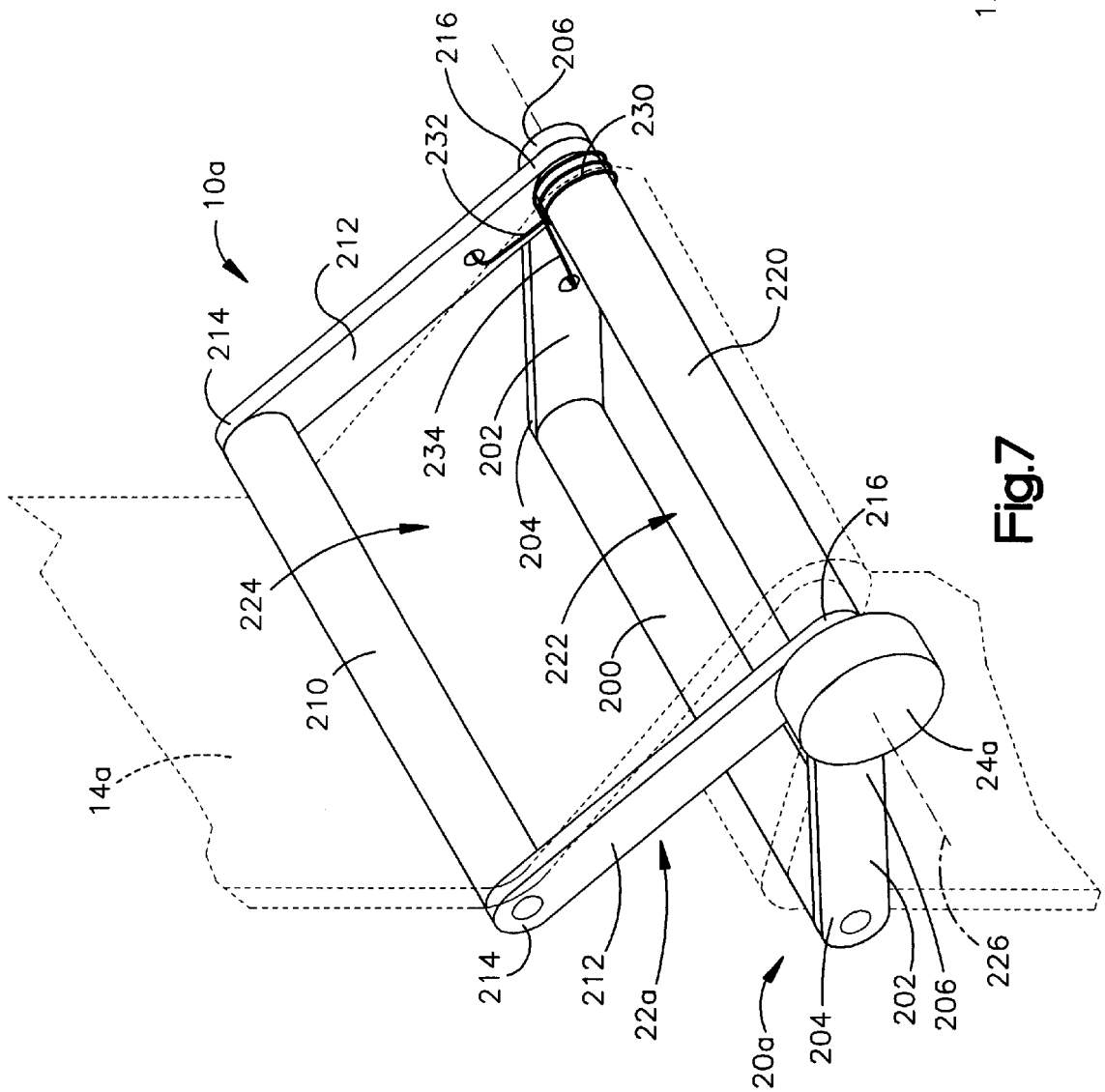

SEAT BELT TENSION SENSING APPARATUS

FIELD OF THE INVENTION

The present invention relates to an apparatus for sensing tension in a seat belt.

BACKGROUND OF THE INVENTION

A typical occupant restraint system for a vehicle includes a seat belt that has opposite ends anchored to the vehicle and is extensible about the occupant. The seat belt thus helps restrain the occupant in the event of a vehicle collision or a sudden deceleration of the vehicle. Seat belts are also used to help secure child safety seats in the vehicle seat. When using a seat belt to help secure the child safety seat, it is common to draw the seat belt tight in order to secure the safety seat tightly in the vehicle.

It is known to use one or more sensor apparatuses in conjunction with an inflatable vehicle occupant protection device for helping to protect an occupant of a vehicle. The sensor apparatus provides information to a controller that controls the inflation of the inflatable vehicle occupant protection device in accordance with conditions sensed by the sensor apparatus. One such condition is the weight of the person or object occupying the vehicle seat.

SUMMARY OF THE INVENTION

In accordance with the present invention, an apparatus includes a first member and a second member connected to the first member. The first and second members are pivotable relative to each other about an axis. Biasing means biases the first member to pivot in a first rotational direction relative to the second member about the axis. A vehicle seat belt engages the first member and urges the first member to pivot against the bias of the biasing means in a second rotational direction about the axis, opposite the first rotational direction, as tension in the seat belt increases. This causes the relative angular position of the first and second members to change in proportion to the amount of tension on the seat belt. The apparatus also includes means for measuring the angular position of the first member relative to the second member. The means provides a signal that corresponds to the angular position of the first member relative to the second member. The signal is proportional to the amount of tension in the seat belt.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a schematic view of the apparatus of FIG. 2 installed in a vehicle;

FIG. 4 is a schematic view of the apparatus of FIG. 3 with parts in different positions;

FIG. 5 is a simplified schematic view of the apparatus of FIG. 3;

FIG. 6 is a simplified schematic view of the apparatus of FIG. 4;

FIG. 7 is a perspective view of an apparatus for sensing tension in a seat belt in accordance with a second embodiment of the present invention;

FIG. 8 is a schematic view of the apparatus of FIG. 7 installed in a vehicle;

DESCRIPTION OF THE PREFERRED EMBODIMENTS

Figure 1:
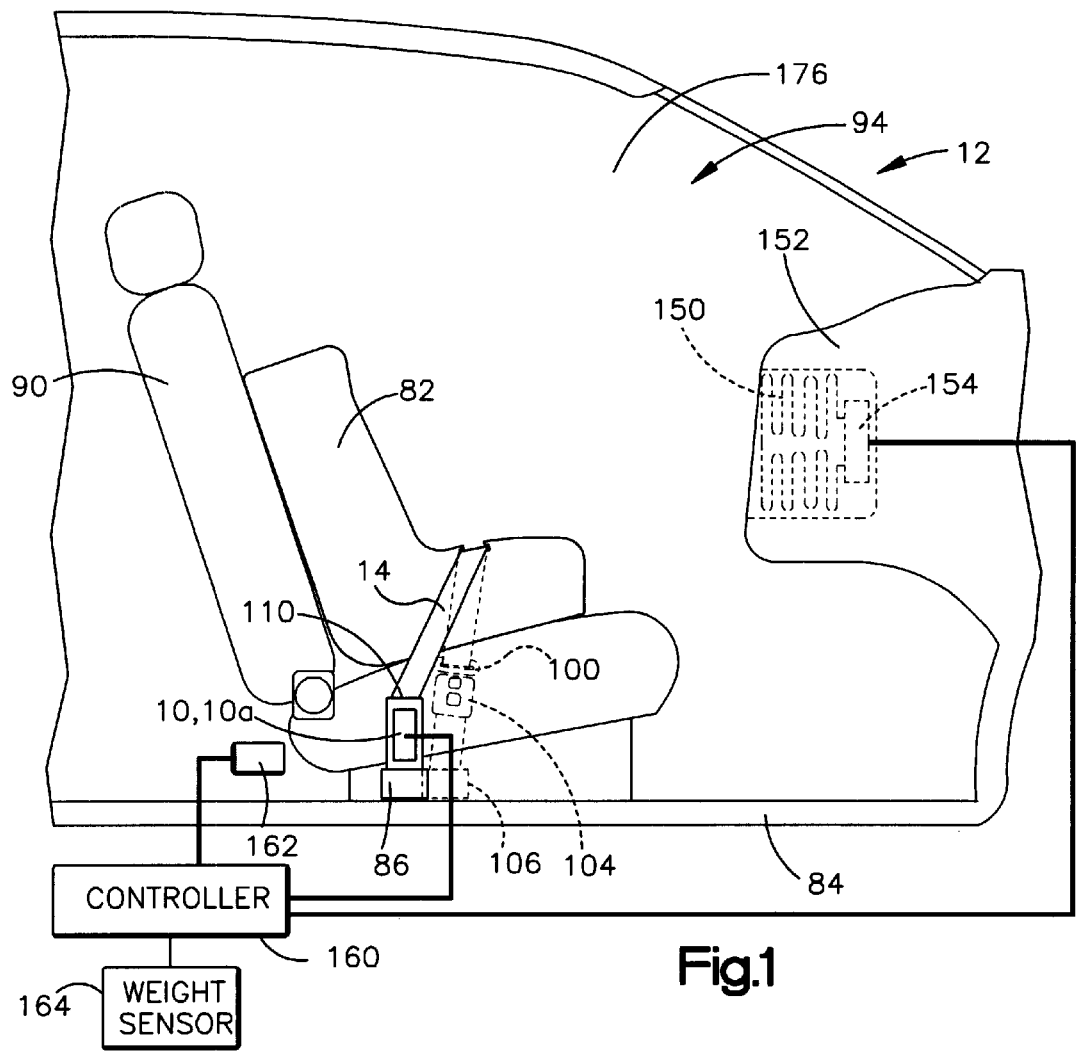
FIG. 1 is a schematic view of a vehicle equipped with an apparatus for sensing tension in a seat belt in accordance with the present invention.
Figure 2:
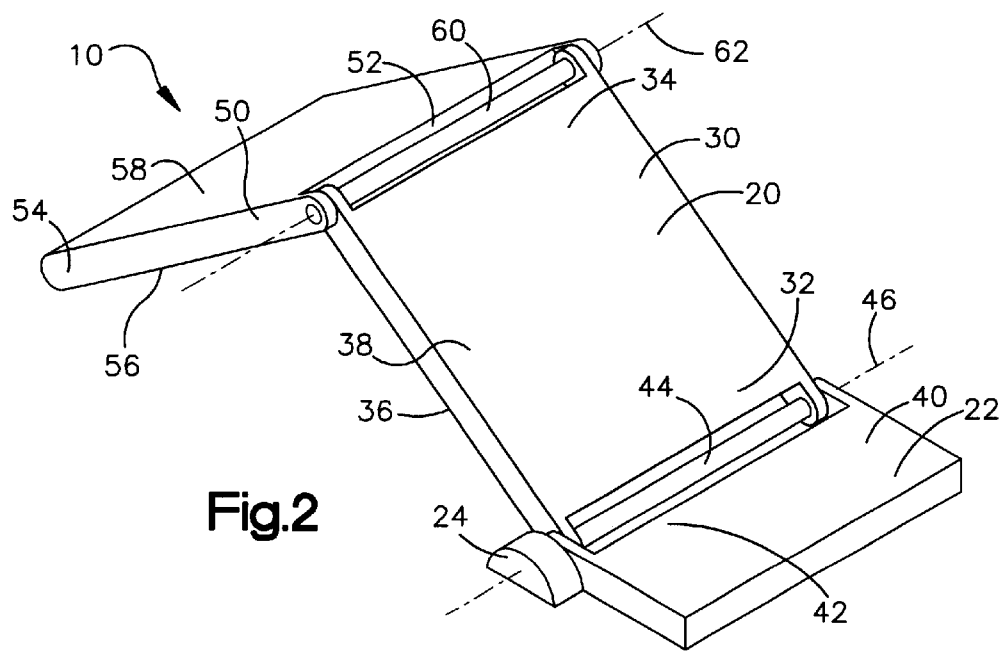
FIG. 2 is a perspective view of an apparatus for sensing tension in a seat belt in accordance with a first embodiment of the present invention.

The present invention relates to a sensor apparatus 10 for sensing tension in a seat belt 14. As illustrated in FIG. 1, the apparatus 10 is installed in a vehicle 12. As illustrated in FIG. 2, the apparatus 10 comprises first and second members 20 and 22, respectively, and means, in the form of a sensor 24, for measuring an angular position of the first member relative to the second member.

According to the first embodiment of the invention, the first member 20 comprises a first guide plate 30, and the second member 22 comprises a mounting plate 40. The first guide plate 30 has a first end 32, an opposite second end 34, and first and second opposite surfaces 36 and 38. The first end 32 of the first guide plate 30 is connected to a first end 42 of the mounting plate 40 by means, such as a hinge 44. The first guide plate 30 and the mounting plate 40 are thus pivotable relative to each other about an axis 46.

The sensor 24 measures the angular position of the first guide member 30 relative to the mounting plate 40. The sensor 24 comprises a known angular position sensor of a suitable configuration. Examples of such angular position sensors are potentiometric, or sliding contact, sensors, and magnetic, or non-contact, sensors.

As illustrated in FIG. 2, the apparatus 10 further comprises a second guide plate 50. The second guide plate 50 has a first end 52, an opposite second end 54, and first and second opposite surfaces 56 and 58. The second end 34 of the first guide plate 30 is connected to the first end 52 of the second guide plate 50 by means, such as a hinge 60. The first and second guide plates 30 and 50 are thereby pivotable relative to each other about an axis 62.

The first and second guide plates 30 and 50 and the mounting plate 40 are constructed of any suitable material, such as metal or plastic. Also, although the embodiment illustrated in FIG. 2 shows hinges 44 and 60 with hinge pins to allow the plates to pivot relative to each other, those skilled in the art will recognize that there may be other suitable means by which to provide such pivotal movement. For example, the guide plates 30 and 50 and the mounting plate 40 may be constructed of a molded plastic material. In this case, the plates 30, 40, and 50 may be molded together as one piece and provided with creases or seams (not shown) between the plates for allowing the plates to pivot relative to each other.

As illustrated in FIG. 1, the seat belt 14 is extensible to help secure a child safety seat 82 to a vehicle seat 90. In FIG. 1, the safety seat 82 is depicted as being secured to the vehicle seat 90 in a front passenger side 94 of the vehicle 12. One end of the seat belt 14 is anchored to the vehicle body 84 at an anchor point 86 located on one side of the vehicle seat 90. The opposite end of the seat belt 14 is attached to tongue assembly 100.

As illustrated in FIG. 1, the seat belt 14 extends around the safety seat 82 to secure the safety seat in the vehicle seat 90. Those skilled in the art will recognize that the safety seat 82 may include means (not shown), such as a slot in a frame of the safety seat, through which the seat belt 14 may extend to secure the safety seat in the vehicle seat 90. The tongue assembly 100 is then connected with a buckle 104. The buckle 104 is connected to the vehicle body 84, on a side of the vehicle seat 90 opposite the anchor point 86, by an anchor plate 106.

In FIG. 1, the seat belt 14 is illustrated as a lap belt. Those skilled in the art, however, will recognize that the seat belt 14 could have an alternative configuration without affecting the operation of the apparatus 10. For example, the seat belt 14 could have a 3-point configuration, including a lap belt and a torso belt.

Referring to FIGS. 3 and 4, the apparatus 10 is installed in the vehicle 12 at a location near the anchor point 86, adjacent the seat belt 14. The apparatus 10 is preferably housed in a protective housing 110, such as a sheath, which helps keep dirt and debris away from the apparatus and helps protect the apparatus. The apparatus 10 is connected to a vehicle surface 112 which, in the embodiment illustrated in FIGS. 3 and 4, is on the housing 110. The apparatus 10 could, however, be connected to any other suitable surface on the vehicle 12, such as on the vehicle seat 90. The first guide plate 30 is thus pivotable relative to the mounting plate 40 and the surface 112 about the axis 46.

In FIGS. 3–6, the seat belt 14 is illustrated as being slightly spaced from the second surfaces 38 and 58 of the first and second guide plates 30 and 50. This is done only for the purpose of providing clarity in the Figures. It should be understood that, in use, the seat belt 14 is in abutting engagement with the second surfaces 38 and 58 when the apparatus 10 is in the conditions illustrated in FIGS. 3–6.

The apparatus 10 (FIGS. 3 and 4) further comprises biasing means, such as a spring 120, positioned between the first and second guide plates 30 and 50 and the surface 112. The spring 120 has a first end 122 that engages the surface 112 and an opposite second end 124 that engages the first surfaces 36 and 56 of the first and second guide plates 30 and 50, respectively. In the embodiment illustrated in FIGS. 3 and 4, the spring 120 is received in a recess 126 in the housing 110.

FIGS. 3 and 4 illustrate the apparatus 10 in different conditions, which depend upon the amount of tension on the seat belt 14. FIG. 3 illustrates a condition in which the seat belt 14 is under little or no tension, and FIG. 4 illustrates a condition in which the seat belt is under a predetermined amount of tension. The conditions of FIGS. 3 and 4 are also illustrated in FIGS. 5 and 6, respectively.

Referring to FIG. 5, the spring 120 biases the first and second guide members 30 and 50 in a first lateral direction, indicated generally by the arrow 130 in FIG. 5. This causes the first guide member 30 to pivot relative to the mounting plate 40 in a first rotational direction, indicated generally by the arrow 132 in FIG. 5. As the first guide member 30 pivots in the first rotational direction, the second end 54 of the second guide member 50 slides along the surface 112 in a direction indicated generally by the arrow labeled 134 in FIG. 5. Since the seat belt 14 illustrated in FIG. 5 is under relatively little or no tension, the seat belt 14 is displaced laterally, in the first lateral direction, under the bias of the spring 120. This is because the tension on the seat belt 14 is insufficient to overcome the bias of the spring 120.

Tension on the seat belt 14 acts against the bias of the spring 120. The tension on the seat belt is indicated generally by the arrow labeled 140 in FIG. 6. As the tension on the seat belt 14 increases, the seat belt overcomes the bias of the spring 120, which acts to reduce the lateral displacement of the seat belt. The seat belt 14 thus begins to move in a second lateral direction, opposite the first lateral direction. The second lateral direction is indicated generally by the arrow labeled 142 in FIG. 6.

As the seat belt 14 moves in the second lateral direction, the seat belt urges the first guide plate 30 to pivot relative to the mounting plate 40 in a second rotational direction, opposite the first rotational direction. The second rotational direction is indicated generally by the arrow labeled 144 in FIG. 6. As the first guide member 30 pivots in the second rotational direction, the second end 54 of the second guide member 50 slides along the surface 112 in a direction indicated generally by the arrow labeled 146 in FIG. 6.

The distance that the first guide plate 30 pivots in the second rotational direction, against the bias of the spring 120, will vary depending upon the amount of tension on the seat belt 14. The distance that the first guide plate 30 pivots in the first rotational direction is proportional to the amount of tension on the seat belt 14. This is true for tension loads on the seat belt 14 up to a predetermined amount. As illustrated in FIG. 6, when the tension on the seat belt 14 reaches the predetermined amount, the seat belt is drawn taut. In the condition illustrated in FIG. 6, the seat belt 14 extends in a generally straight line and undergoes zero or negligible displacement in the first lateral direction.

The sensor 24 senses the angular position of the first guide member 30 relative to the mounting plate 40 and provides a corresponding output. The output provided by the sensor 24 is proportional to the tension on the seat belt 14 because the first guide plate 30 pivots in the first rotational direction in proportion to the amount of tension on the seat belt 14. Thus, the sensor 24 provides an output that corresponds to the amount of tension on the seat belt 14.

Referring to FIG. 1, the vehicle 12 includes an inflatable vehicle occupant protection device, such as an air bag 150. The air bag 150 is stored in a folded condition in an instrument panel 152 of the vehicle on the passenger side 94 of the vehicle. When the vehicle 12 experiences a crash in which it is desirable to inflate the air bag, an inflator 154 is actuated and provides inflation fluid for inflating the inflatable occupant protection device. The inflation fluid directed into the air bag inflates the air bag from the folded condition to an inflated condition in which the air bag extends into an occupant compartment 176. The inflated air bag 150 helps protect the occupant 82 from a forceful impact with parts of the vehicle 12.

Shown schematically in FIG. 1, an electronic controller 160, such as a microcomputer, is operatively connected to a vehicle crash sensor 162, which senses the occurrence of a vehicle crash. The controller 160 is also connected to the apparatus 10 and the inflator 154. The controller 160 may further be connected to a weight sensor 164 for sensing the weight in the vehicle seat 90. Upon ignition of the vehicle 12, i.e. when the vehicle is started, the apparatus 10 and the weight sensor 164 begin providing information to the controller. Once the controller 160 determines that a crash is occurring for which inflation of the air bag 150 is necessary to help protect the occupant 82, the controller actuates the inflator 154. Actuation of the inflator 154 is carried out in accordance with information provided to the controller 160 by the apparatus 10 and the weight sensor 164.

The sensor 24 of the apparatus 10 provides a signal to the controller 160 in proportion to the amount of tension on the seat belt 14, as described above. The controller 160 calculates the amount of tension on the seat belt 14 based upon the signal received from the sensor 24. The controller 160 controls the amount of inflation fluid directed into the air bag 150 by the inflator 154. The controller 160 determines the amount of inflation fluid directed into the air bag 150 based on the amount of tension on the seat belt 14 sensed by the apparatus 10 and the amount of weight on the vehicle seat 90 sensed by the sensor 164.

When the seat belt 14 is used to help secure the safety seat 82 in the vehicle seat 90, the seat belt 14 is typically pulled tight in order to secure the safety seat to the vehicle seat 90. This differs from the instance where an occupant 82 is seated in the vehicle seat 90 and the seat belt 14 is fitted comfortably or loosely around the occupant. The tension on the seat belt 14 pulls down on the safety seat 82 and causes the weight sensor 164 to be subjected to the weight of the safety seat with the child in it and the downward force resulting from the tension in the seat belt. The output signal from the weight sensor 164 thus indicates a sensed weight of the safety seat 82 with the child in it, which is greater than the actual weight of the safety seat and the child. The sensed weight may be different than, and may be significantly greater than the actual weight because of the large tension load placed on the seat belt 14.

The apparatus 10 senses the tension in the seat belt 14, as described above. The controller 160 determines a computed weight of the safety seat 82 and the child based on the sensed weight and the sensed tension in the seat belt 14. The computed weight will approximate the actual combined weight of the child seat and the child. The computed weight may, however, differ slightly from the actual weight of the child seat and the child.

The controller 160 may have a look-up table that stores a plurality of sensed weight values, a plurality of seat belt tension values, and a plurality of computed weight values corresponding to combinations of the sensed weight values and the seat belt tension values. The computed weight values stored in the look-up table would be empirically determined. The controller 160 would select a predetermined computed weight value from the look-up table by matching the sensed values from the apparatus 10 and the weight sensor 164 against the values of weight and seat belt tension stored in the table.

Alternatively, the controller 160 could determine the computed weight by performing a computation based on a predetermined functional relationship between the sensed weight and the amount of seat belt tension. In either case, the computed weight determined by the controller 160 more closely approximates the actual weight of the safety seat 82 and the child in the safety seat, as compared with the sensed weight indicated by the sensor 164, because the effect of the tension on the seat belt 14 is considered in determining the computed weight.

If the tension on the seat belt 14 is above a predetermined value and the computed weight is below a predetermined value, the controller 160 determines the presence of a low weight object, such as the safety seat 82, in the vehicle seat 90. If the controller 160 determines that a low weight object is located in the vehicle seat 90, the controller disables the inflator 154 to prevent inflation of the air bag 150. Alternatively, if the controller 160 determines that a low weight object is located in the vehicle seat 90, the controller may cause the inflator 154 to direct a reduced amount of inflation fluid to the air bag 150. As a further alternative, the controller 160 may prevent inflation or reduce the amount of inflation fluid directed into the air bag 150 based only on whether the tension on the seat belt is above the predetermined value.

A second embodiment of the present invention is illustrated in FIGS. 7–11. The second embodiment of the invention is similar to the first embodiment of the invention illustrated in FIGS. 1–6. Accordingly, numerals similar to those of FIGS. 1–6 will be utilized in FIGS. 7–11 to identify similar components, the suffix letter "a" being associated with the numerals of FIGS. 7–11 to avoid confusion.

As illustrated in FIG. 1, the apparatus 10a is installed in the vehicle 12 in generally the same location as the apparatus 10 of the first embodiment. As illustrated in FIG. 7, the apparatus 10a comprises first and second members 20a and 22a, respectively, and means, in the form of a sensor 24a, for measuring an angular position of the first member relative to the second member.

According to the second embodiment of the invention, the first member 20a comprises a first cross-member 200 and a pair of first linkages 202. The first linkages 202 each have a first end 204 and an opposite second end 206. The first ends 204 of the first linkages 202 are connected to and extend perpendicularly from opposite ends of the first cross-member 200.

The second member 22a comprises a second cross-member 210 and a pair of second linkages 212. The second linkages 212 each have a first end 214 and an opposite second end 216. The first ends 214 of the second linkages 212 are connected to and extend perpendicularly from opposite ends of the second cross-member 210.

The apparatus 10a further comprises a third cross-member 220 that extends between and interconnects the second ends 206 and 216 of the first and second pairs of linkages 202 and 212. The first cross-member 200, second cross-member 210 and third cross-member 220 extend generally parallel to each other. The first cross-member 200 and the first linkages 202 are pivotable relative to the second cross-member 210 and the second linkages 212 about an axis 226. The axis 226 extends through, and is coaxial with, the third cross-member 220.

The first cross-member 200, first linkages 202 and third cross-member 220 define a generally rectangular first seat belt aperture 222. The second cross-member 210, second linkages 212 and third cross-member 220 define a generally rectangular second seat belt aperture 224.

The apparatus 10a includes means, such as a spring 230, that is adapted to bias the first cross-member 200 and first linkages 202 to pivot relative to the second cross-member 210 and the second linkages 212. As illustrated in FIG. 7, the spring 230 comprises a torsion spring that has a first arm 232 connected to one of the first linkages 202 and a second arm 234 connected to one of the second linkages 212. Those skilled in the art, however, will recognize that alternative means may be used to bias the first cross-member 200 and first linkages 202 to pivot relative to the second cross-member 210 and the second linkages 212.

The apparatus 10a in FIG. 7 is illustrated in a normal or at rest position, wherein the first and second arms 232 and 234 of the spring 230 are not displaced. When the spring 230 is in the normal position, the spring does not bias the first cross-member 200 and first linkages 202 to pivot relative to the second cross-member 210 and the second linkages 212. Rather, the spring 230 acts to maintain the first cross-member 200 and first linkages 202 positioned at a predetermined angle relative to the second cross-member 210 and the second linkages 212. If a force acts on the apparatus 10a to urge the first cross-member 200 and first linkages 202 to pivot relative to the second cross-member 210 and the second linkages 212, the spring 230 biases the cross-members and linkages to return to the normal position of FIG. 7.

Figure 9:
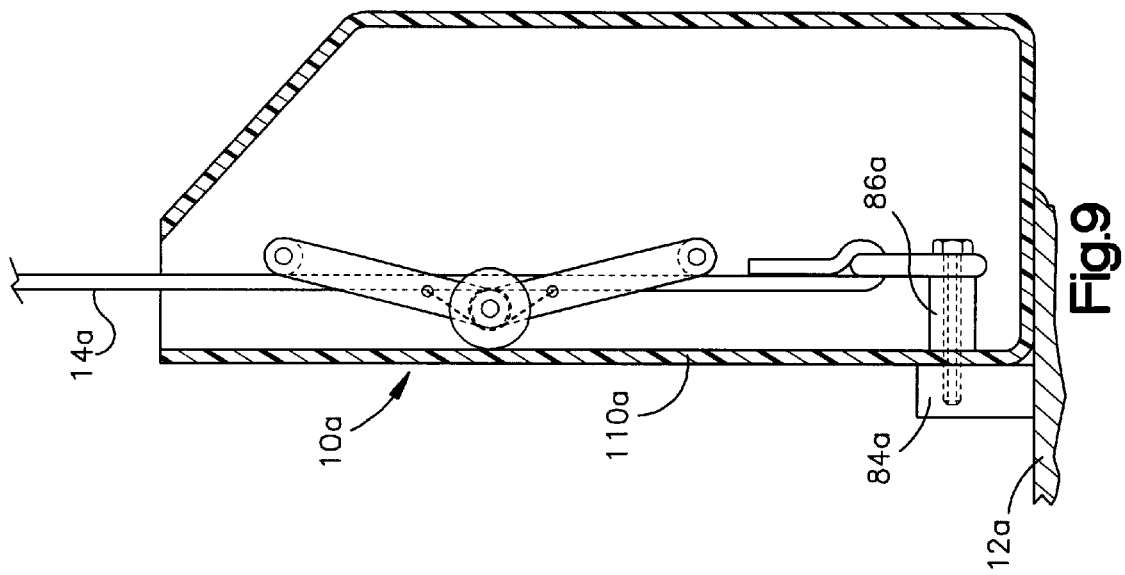
FIG. 9 is a schematic view of the apparatus of FIG. 8 with parts in different positions.

Referring to FIGS. 8 and 9, the apparatus 10a is installed in the vehicle 12a at a location near the anchor point 86a and the seat belt 14a. The apparatus 10a is preferably housed in a protective housing 110a, such as a sheath, which helps keep dirt and debris away from the apparatus and helps protect the apparatus. The seat belt 14a extends through the apparatus 10a to help support the apparatus in the vehicle 12a. In the embodiment illustrated in FIGS. 8 and 9, the apparatus 10a is supported in the vehicle 12a by the seat belt 14a alone. Additional means, such as brackets (not shown) or molding the housing 110a to help support the apparatus 10a, may also be used to support the apparatus 10a in the housing.

Figure 11:
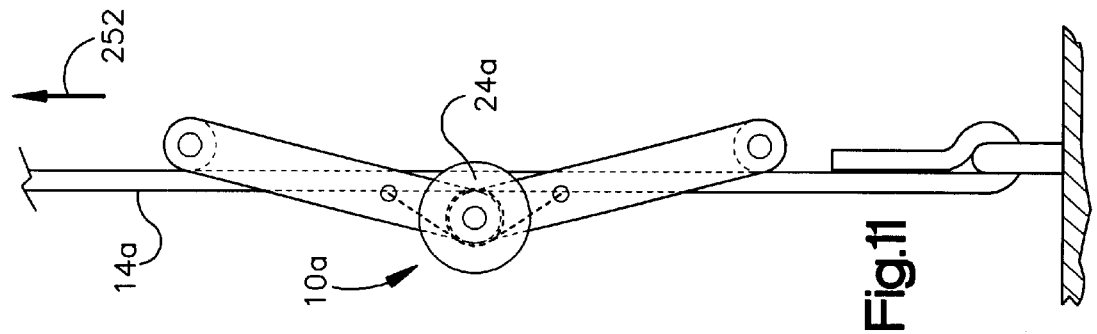
FIG. 11 is a simplified schematic view of the apparatus of FIG. 9.

FIGS. 8 and 9 illustrate the apparatus 10a in different conditions, which depend upon the amount of tension on the seat belt 14a. FIG. 8 illustrates a condition in which the seat belt 14a is under little or no tension, and FIG. 9 illustrates a condition in which the seat belt is under a predetermined amount of tension. The conditions of FIGS. 8 and 9 are also illustrated in FIGS. 10 and 11, respectively.

Referring to FIGS. 7–10, the seat belt 14a extends through the first and second seat belt apertures 222 and 224 and wraps around the first, second and third cross-members 200, 210, and 220. Following the path of the seat belt 14a in FIG. 10 from the anchor point 86a, the belt winds around the first cross-member 200 in a first curved direction and extends through the first seat belt aperture 222. The first curved direction is generally clockwise as viewed in FIG. 10 and is indicated generally by the arrow labeled 242 in FIG. 10. The seat belt 14a wraps around the third cross-member 220 in a second curved direction and extends through the second seat belt aperture 224. The second curved direction is generally counterclockwise as viewed in FIG. 10 and is indicated generally by the arrow labeled 244 in FIG. 10. The seat belt 14a then wraps around the second cross-member 210 in the first curved direction as indicated at 246.

Figure 10:
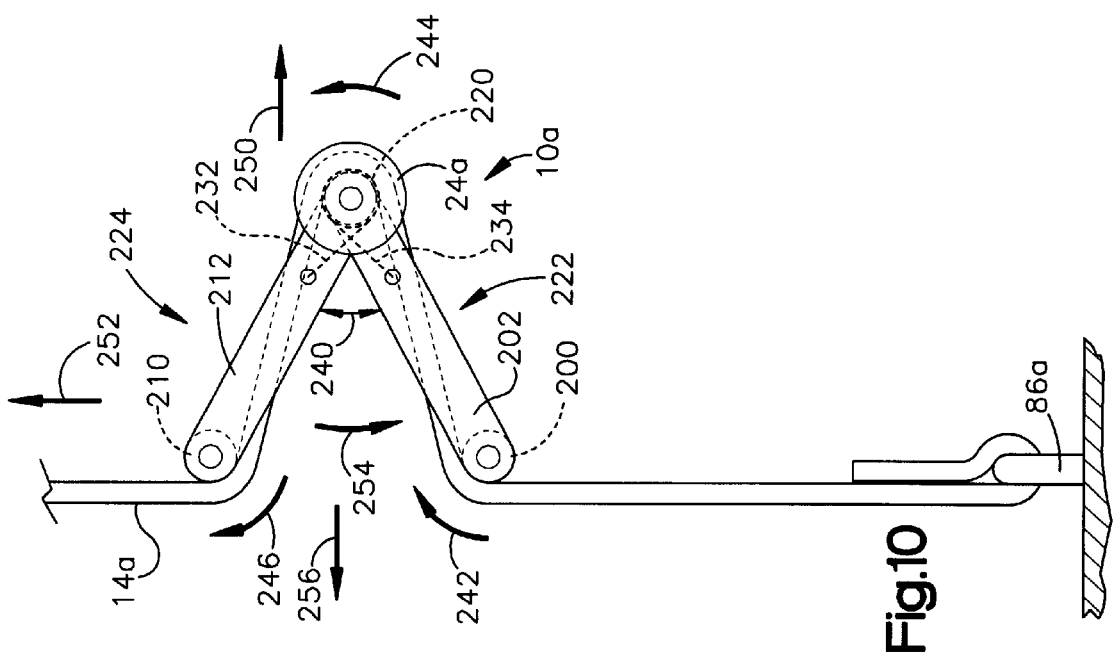
FIG. 10 is a simplified schematic view of the apparatus of FIG. 8.

In FIG. 10, the apparatus 10a is positioned generally in the normal position, i.e., the first cross-member 200 and first linkages 202 are positioned at a predetermined angle relative to the second cross-member 210 and the second linkages 212. The predetermined angle is indicated generally at 240. The seat belt 14a is thus displaced laterally, in a first lateral direction, because the seat belt winds around the cross-members in the manner described above. This is because the tension on the seat belt 14a is insufficient to overcome the bias of the spring 230. The first lateral direction is indicated generally by the arrow labeled 250 in FIG. 10.

The tension on the seat belt is indicated generally by the arrow labeled 254 in FIG. 10. Tension on the seat belt 14a acts on the first and second cross-members 200 and 210 to cause the first cross-member and first linkages 202 to pivot relative to the second cross-member and the second linkages 212 in a first rotational direction. The first rotational direction is indicated generally by the arrow labeled 254 in FIG. 10. As the first cross-member 200 and first linkages 202 pivot relative to the second cross-member 210 and the second linkages 212 in the first rotational direction, the first and second arms 232 and 234 of the spring 230 are displaced in the first rotational direction. This causes the seat belt 14a to move in a second lateral direction, opposite the first lateral direction. The second lateral direction is indicated generally by the arrow labeled 256 in FIG. 10.

As tension on the seat belt 14a increases and the first cross-member 200 and first linkages 202 pivot relative to the second cross-member 210 and the second linkages 212 in the first rotational direction, the spring 230 urges the cross-members and linkages to pivot relative to each other in the second, opposite rotational direction towards the normal position. The bias created by the spring 230 increases as the tension on the seat belt 14a increases. Thus, the distance that the first cross-member 200 and first linkages 202 pivot relative to the second cross-member 210 and the second linkages 212 in the first rotational direction is proportional to the amount of tension on the seat is belt 14a. This is true for tension loads on the seat belt 14a up to a predetermined amount. As illustrated in FIG. 11, when the tension on the seat belt 14a reaches the predetermined amount, the seat belt is drawn taut. In the condition illustrated in FIG. 11, the seat belt 14a extends in a generally straight line and undergoes zero or negligible displacement in the first lateral direction 250.

The sensor 24a senses the position of the first cross-member 200 relative to the second cross-member 210 as measured by the angle between the first and second linkages 202 and 204. The sensor 24a provides an output corresponding to the sensed angular position. The output provided by the sensor 24a is proportional to the tension on the seat belt 14a because the first cross-member 200 and first linkages 202 pivot relative to the second cross-member 210 and the second linkages 212 in the first rotational direction in proportion to the amount of tension on the seat belt. Thus, the sensor 24a provides an output that corresponds to the amount of tension on the seat belt 14a.

Referring to FIG. 1, the apparatus 10a is associated with the controller 160 in a manner identical to the apparatus 10 of the first embodiment. Thus, actuation of the inflator 154 may be carried out by the controller 160 in accordance with the amount of tension on the seat belt 14 as sensed by the apparatus 10a. The manner in which the controller 160 uses the sensed tension signal provided by the apparatus 10a is identical to the manner in which the controller uses the sensed tension signal provided by the apparatus 10 of the first embodiment, the only difference being the different construction of the apparatuses.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a first member;

a second member connected to said first member, said first and second members being pivotable relative to each other about an axis;

biasing means that biases said first member to pivot in a first rotational direction relative to said second member about said axis;

a vehicle seat belt engaging said first member and urging said first member to pivot against the bias of said biasing means in a second rotational direction about said axis, opposite said first rotational direction, as tension in said seat belt increases to vary the relative angular position of said first and second members, said angular position of said first member changing in proportion to the amount of tension in the seat belt; and measuring means for measuring the angular position of said first member relative to said second member, said measuring means providing a signal that corresponds to said angular position of said first member relative to said second member, said signal being proportional to the amount of tension in the seat belt.

2. Apparatus as defined in claim 1, wherein said first member comprises a first guide plate and said second member comprises a mounting plate, said first guide plate and said mounting plate each having a first end and an opposite second end, said first end of said first guide plate and said first end of said mounting plate being connected to each other and pivotable relative to each other about said axis, said mounting plate being connected to the vehicle, said measuring means measuring the angular position of said first guide plate relative to said mounting plate.

3. Apparatus as defined in claim 2, wherein said first member is connected to said mounting plate by a hinge.

4. Apparatus as defined in claim 2, wherein said second end of said first guide plate is connected to a second guide plate, said first guide plate being pivotable relative to said second guide plate about a second axis.

5. Apparatus as defined in claim 4, wherein said first guide plate is connected to said second guide plate by a hinge.

6. Apparatus as defined in claim 2, wherein said biasing means is positioned between said first guide plate and a vehicle surface, said biasing means having a first end engaging said vehicle surface and an opposite second end that engages a first surface of said first guide plate, said biasing means urging said first guide plate away from said vehicle surface in a first lateral direction which causes said first guide plate to pivot relative to said mounting plate in said first rotational direction, said seat belt engaging a second surface of said first guide plate, opposite said first surface of said first guide plate, said seat belt urging said first guide plate towards said vehicle surface in a second lateral direction, opposite said first lateral direction, which causes said first guide plate to pivot relative to said mounting plate in said second rotational direction as the tension in said seat belt increases.

7. Apparatus as defined in claim 6, wherein said second guide plate has a second end, opposite said first end, said second end of said second guide plate slidably engaging said vehicle surface and sliding along said vehicle surface when said first guide plate moves in said first and second lateral directions.

8. Apparatus as defined in claim 1, wherein said seat belt has a first end connected to a retractor and an opposite second end connected by an anchor to a vehicle in which said seat belt is installed, said apparatus further including a seat belt tongue connected to said seat belt between said first and second ends of said seat belt and a seat belt buckle connected to the vehicle, said seat belt buckle receiving said seat belt tongue and releasably locking said seat belt tongue in said seat belt buckle.

9. Apparatus as defined in claim 8, wherein said apparatus is positioned near the second end of said seat belt proximate the anchor.

10. Apparatus as defined in claim 1, wherein said first member comprises a first cross-member and a pair of first linkages, each of said first linkages having a first end and an opposite second end, said first end of one of said first linkages being connected to one end of said first cross-member, said first end of the other of said first linkages being connected to an opposite end of said first cross-member, said first linkages extending parallel to each other and perpendicularly from said first cross-member, said second member comprising a second cross-member and a pair of second linkages, each of said second linkages having a first end and an opposite second end, said first end of one of said second linkages being connected to one end of said second cross-member, said first end of the other of said second linkages being connected to an opposite end of said second cross-member, said second linkages extending parallel to each other and perpendicularly from said second cross-member, said apparatus further comprising a third cross-member that extends between and interconnects said second ends of said first and second linkages, said first, second and third cross members extending parallel to each other, said first and second linkages being pivotable about said axis, said first and second cross-members being pivotable with said first and second linkages, respectively, about said axis, said axis extending through said third cross-member.

11. Apparatus as defined in claim 10, wherein said measuring means measures said angular position of said first linkages relative to said second linkages.

12. Apparatus as defined in claim 10, wherein said first cross-member, said third cross-member, and said first linkages define a first seat belt aperture, said second cross-member, said third cross-member, and said second linkages defining a second seat belt aperture, said seat belt extending through said first seat belt aperture in a first direction, around said third cross-member, and through said second seat belt aperture in a second direction, different than said first direction.

13. Apparatus as defined in claim 12, wherein the seat belt extends around said first and second cross-members in a first curved direction and around said third cross-member in a second curved direction, opposite said first curved direction.

14. Apparatus as defined in claim 13, wherein said first curved direction is generally clockwise and said second curved direction is generally counterclockwise.

15. Apparatus as defined in claim 13, wherein said first curved direction is generally counterclockwise and said second curved direction is generally clockwise.

16. Apparatus as defined in claim 13, wherein said biasing means urges said first and second linkages to form angles with each other, said seat belt undergoing lateral displacement by said first, second and third cross-members under the bias of said biasing means, said seat belt urging said first and second linkages against the bias of said biasing means, which reduces said lateral displacement as the tension in said seat belt increases.

17. Apparatus as defined in claim 13, wherein said seat belt has a first end connected to a retractor and an opposite second end connected by an anchor to a vehicle in which said seat belt is installed, said apparatus further including a seat belt tongue connected to said seat belt between said first and second ends of said seat belt and a seat belt buckle connected to the vehicle, said seat belt buckle receiving said seat belt tongue and releasably locking said seat belt tongue in said seat belt buckle.

18. Apparatus as defined in claim 17, wherein said tension sensing apparatus is positioned near said second end of said seat belt, proximate said anchor.

19. Apparatus as defined in claim 1, further comprising a controller operatively connected to said measuring means, said controller receiving said signal from said measuring means.

20. Apparatus as defined in claim 19, wherein said controller is operatively connected to an inflator for providing inflation fluid for inflating an inflatable vehicle occupant protection device, said controller preventing actuation of the inflator when said signal is at a predetermined level.

21. Apparatus as defined in claim 20, wherein said controller calculates the amount of tension in the seat belt, said controller preventing actuation of the inflator when the tension in the seat belt is at a predetermined level.

22. Apparatus as defined in claim 1, wherein said biasing means comprises a spring.

23. Apparatus comprising:

a first member having first and second ends;

a second member having first and second ends, said first end of said first member and said first end of said second member being pivotally connected to each other for pivotal movement about a common pivot axis;

biasing means that biases said first and second members to pivot about said pivot axis into a V-shape having a pair of legs comprising said first and second members extending at a first angle to each other and an apex, said pivot axis being at said apex, said second ends of said first and second members forming second and third angles with a reference surface;

a vehicle seat belt applying force to said first and second members at said apex, said force causing said second end of at least one of said first and second members to move relative to the second end of the other of said first and second members as tension in said seat belt varies and causing a change in said first, second and third angles, said first, second and third angles changing in proportion to the amount of tension in the seat belt; and measuring means for measuring said change in at least one of said first, second and third angles, said measuring means providing a signal indicative of the amount of tension in the seat belt.

* * * * *